(12) United States Patent
Harrison et al.

(10) Patent No.: US 11,198,133 B2
(45) Date of Patent: Dec. 14, 2021

(54) SYSTEM FOR SEPARATION OF VISCOUS MATERIALS FROM SOLIDS

(71) Applicant: STItech Industries Inc., Leduc (CA)

(72) Inventors: James Harrison, Kamloops (CA); Emmanuel L'Ecuyer, Leduc (CA)

(73) Assignee: STITECH INDUSTRIES INC, Leduc (CA)

( * ) Notice: Subject to any disclaimer, the term of this patent is extended or adjusted under 35 U.S.C. 154(b) by 270 days.

(21) Appl. No.: 16/153,439

(22) Filed: Oct. 5, 2018

(65) Prior Publication Data

US 2019/0105664 A1 Apr. 11, 2019

Related U.S. Application Data

(60) Provisional application No. 62/569,280, filed on Oct. 6, 2017.

(51) Int. Cl.
| | |
|---|---|
| *B03B 5/00* | (2006.01) |
| *B01D 17/02* | (2006.01) |
| *F15D 1/00* | (2006.01) |
| *B02C 19/06* | (2006.01) |
| *B04C 3/00* | (2006.01) |
| *B08B 3/02* | (2006.01) |
| *C10G 1/04* | (2006.01) |
| *B03B 9/06* | (2006.01) |
| *B03B 5/68* | (2006.01) |
| *B01D 11/04* | (2006.01) |
| *B01D 11/02* | (2006.01) |

(52) U.S. Cl.
CPC ............... *B03B 5/00* (2013.01); *B01D 17/02* (2013.01); *B02C 19/06* (2013.01); *B02C 19/065* (2013.01); *B02C 19/068* (2013.01); *B03B 5/68* (2013.01); *B03B 9/061* (2013.01); *B04C 3/00* (2013.01); *B08B 3/022* (2013.01); *C10G 1/045* (2013.01); *F15D 1/00* (2013.01); *B01D 11/0211* (2013.01); *B01D 11/0257* (2013.01); *B01D 11/0419* (2013.01); *B04C 2003/003* (2013.01)

(58) Field of Classification Search
CPC .. B03B 5/00; B03B 5/68; B03B 9/061; B02C 19/06; B02C 19/065; B02C 19/005; B01D 17/02; F16D 1/00; B04C 3/00; B08B 3/022; C10G 1/045
See application file for complete search history.

(56) References Cited

U.S. PATENT DOCUMENTS

| 2,846,150 | A | * | 8/1958 | Work | B24C 9/00 241/5 |
|---|---|---|---|---|---|
| 5,695,130 | A | * | 12/1997 | Csendes | B02C 13/18 241/19 |
| 6,712,215 | B2 | * | 3/2004 | Scheybeler | C10G 1/04 208/390 |
| 7,416,671 | B2 | * | 8/2008 | Bozak | C10G 1/047 208/391 |

(Continued)

*Primary Examiner* — Patrick H Mackey
(74) *Attorney, Agent, or Firm* — Kilpatrick Townsend & Stockton LLP

(57) ABSTRACT

The present invention relates to a method of cleaning solids to be free of, or separating solids from, viscous materials and in some cases other solids such as, but not limited to resins and other coatings, foreign debris, clays, silts, contaminated water or chemicals and in other cases separating some liquids form some other liquids. Also disclosed are systems to accomplish such.

19 Claims, 11 Drawing Sheets

(56) References Cited

U.S. PATENT DOCUMENTS

| | | | |
|---|---|---|---|
| 2013/0068863 A1* | 3/2013 | Coates | B02C 23/08 241/5 |
| 2016/0348315 A1* | 12/2016 | Tanaka | B02C 19/068 |
| 2017/0239629 A1* | 8/2017 | Galaka | B01F 5/0074 |
| 2019/0105661 A1* | 4/2019 | Harrison | B02C 19/06 |
| 2019/0105662 A1* | 4/2019 | Harrison | B03B 5/68 |
| 2019/0118188 A1* | 4/2019 | Harrison | B02C 19/065 |

\* cited by examiner

SYSTEM FOR SEPARATION OF VISCOUS MATERIALS FROM SOLIDS

CROSS-REFERENCES TO RELATED APPLICATIONS

This application claims priority to U.S. Provisional Patent Application No. 62/569,280, filed on Oct. 6, 2017, the disclosure of which is hereby incorporated by reference in its entirety for all purposes.

FIELD OF THE INVENTION

The present invention relates to a method of cleaning solids to be free of, or separating solids from, viscous materials and in some cases other solids such as, but not limited to resins and other coatings, foreign debris, clays, silts, contaminated water or chemicals and in other cases separating some liquids form some other liquids.

BACKGROUND OF THE INVENTION

The capture, reuse or repurpose of materials in industrial waste streams is often not cost-effective due to the extent of process required to capture the materials, often related to high energy and infrastructure cost requirements and the many variables that make consistency in composition of the waste streams impractical to manage and often leading to inabilities of systems to maintain a consistent level of performance. The environmental and sometime economic impact of such recycling processes can often exceed the costs and environmental impact of new materials.

In particular, upstream, midstream, and downstream operations involving but not limited to the extraction, processing, refinement, management, handling, transportation and disposal of oil and gas often results in contaminated waste products which are difficult and expensive to dispose of properly in a manner consistent with safety and environmental regulations. Additionally, such waste may include product or material which may be valuable or reusable if it were possible to separate and clean the material in a cost-effective manner.

As well, lands contaminated with hydrocarbons, petrochemicals, other chemical compositions or decomposed waste gasses may have negative effects on the environment, the property, other properties or bodies of water which are difficult and expensive to remove or reclaim in a manner consistent with safety and environmental regulations. Additionally, there may be significant recovery value to the land or other lands if it were possible to separate and clean the material in a cost-effective manner or there may be a requirement to prevent environmental damage which may be caused by the presence of such materials in the lands and it is required to be removed to mitigate any such negative effect. The inventors are hitherto unaware of the existence of a technology capable of cost efficiently treating large amounts of waste material.

Therefore, there exists in the art, a need for methods and systems which may capture, renew and/or repurpose or eliminate materials in industrial waste streams, preferably with minimal energy and infrastructure requirements, and which further can be accommodated on a consistent, sustainable and efficient manner that may provide the user capacity to reduce environmental footprints.

BRIEF SUMMARY OF THE INVENTION

According to a first aspect of the invention, there is provided a method to clean, separate and segregate solids from a liquid phase, using a high velocity accelerator. According to a preferred embodiment, is a method and system to clean, separate, segregate or eliminate undesirable contaminants from aqueous solutions, particularly in methods and systems to treat industrial waste streams having a solid material contaminated or associated with another substance hydrocarbons, petrochemicals, other fossil fuels, other chemical compounds or gaseous materials from decomposition of waste. Preferably, the treatment results in substantially clean, segregated or eliminated materials with levels that are environmentally acceptable and/or industry standard acceptable for reuse and or disposition as intended by a user. Operational costs to the user may be reduced through the diversion of disposal or retained holding of waste products. As a result, environmentally sustainable methods to manage solid based waste products may be possible.

According to another aspect of the present invention, there is provided a method of cleaning contaminated solids comprising the steps of:
  a) using a liquid such as water, or as may be required by the user, water and/or other materials to create an aqueous slurry of the contaminated solids;
  b) processing the slurry in an apparatus which uses high velocity water streams which cause a result of particulate and liquid separation and further result of dissimilar liquid separation and dissimilar particulate separation through the induction of a state where liquids begin to and/or completely vaporize and/or experience a phase state change in various degrees. Rapid acceleration on a rotational angle of the solid and liquid materials results in interparticle collisions and collection of solid particles in a central flow within a liquid and/or vaporized flow; and
  c) separating solid particles from other components in the liquid flow; and
  d) a series of separation modules which receives the output of the apparatus and separates solids, liquids and gases according to their density; and
  e) a process that captures, recycles, cleans and reuses all or substantially all the water used for creation of the aqueous solution.

According to another aspect of the present invention, there is provided a method of cleaning contaminated solid particles comprising the steps of:
  creating a slurry comprising waste material comprising contaminated solid particles by mixing said waste material with a liquid;
  introducing said slurry into an entry port located at a first extremity of a high velocity accelerator, where said high velocity accelerator is adapted to impart an increase in the velocity of the material introduced therein;
  processing the slurry in said high velocity accelerator; by rapidly expanding the volume of said slurry introduced into the high velocity accelerator without diminishing the velocity thereof;
  imparting a rapid acceleration at an angle to the slurry stream of solid and liquid materials to displace said slurry stream in a concentric path towards an outflow port situated at one extremity of an internal chamber of the high velocity accelerator; and
  focusing the slurry stream at a focal point to promote interparticle collisions.

According to another aspect of the invention, there is provided a system to clean, separate and segregate solids from a liquid phase, and additionally methods and systems to clean, separate, segregate or eliminate undesirable contaminants from aqueous solutions, particularly in methods and systems to treat industrial waste streams having a solid material contaminated or associated with another substance hydrocarbons, petrochemicals, other fossil fuels, other chemical compounds or gaseous materials from decomposition of waste. Preferably, the treatment results in substantially clean, segregated or eliminated materials with levels that are environmentally acceptable and/or industry standard acceptable for reuse and or disposition as intended by a user. Operational costs to the user may be reduced through the diversion of disposal or retained holding of waste products. As a result, environmentally sustainable methods to manage solid based waste products may be possible.

According to another aspect of the invention, there is provided a method of cleaning contaminated solids comprising the steps of:

creating a slurry comprising waste material by mixing said waste material with a liquid;

introducing a slurry of material into a high velocity accelerator, where said high velocity accelerator is adapted to impart an increase in the velocity of the materials introduced therein;

processing the slurry in an apparatus which uses high velocity water streams to promote the separation of particulate material and liquid, where liquids begin to and/or completely vaporize and/or experience a phase state change in various degrees;

rapidly expanding the volume of the slurry introduced into the high velocity accelerator without diminishing the velocity of the material;

impart a rapid acceleration on a rotational angle to the stream of solid and liquid materials around an internal chamber of the high velocity accelerator; and focusing the stream at a focal point to promote increased interparticle collisions.

Preferably, the method for cleaning contaminated solids comprises the steps of:

creating a slurry comprising waste material by mixing said waste material with a liquid;

processing the slurry in an apparatus which uses high velocity water streams to promote the separation of particulate material and liquid and further result of dissimilar liquid separation and dissimilar particulate separation through the induction of a state where liquids begin to and/or completely vaporize and/or experience a phase state change in various degrees. Rapid acceleration on a rotational angle of the solid and liquid materials results in interparticle collisions and collection of solid particles in a central flow within a liquid and/or vaporized flow.

Preferably, the method further comprises separating solid particles from other components in the liquid flow. Preferably also, the method further comprises a step of separating solids, liquids and gases from the output of the apparatus according to their density by feeding the liquid flow through at least one separation module. Preferably, the method further comprises a step of introducing aqueous material into a mixing tank where materials are separated into free liquid and saturated solids. The saturated solids are extracted from the tank and then mixed with sufficient water to produce a transportable and treatable slurry which may optionally include chemical process aids if such are desired. The liquids separated from the saturated solid materials may have suspended solid fine particles or other contaminants such as chemicals, and are treated in parallel but separately from the saturated solids.

Preferably, the method further comprises a step of mixing saturated solids or saturated solids with minimal volumes of liquids with water to form a flowable, transportable aqueous slurry that is blended to an average consistency and to ensure solids remain suspended in the slurry for introduction to the high velocity accelerator.

According to another preferred embodiment, the method further comprises a step where the aqueous slurry of material and water passes through a venturi inductor which uses pressurized water flow to re-suspend and blend the slurry to a desired density, pressure, velocity, temperature and/or other parameters which may be desired for introduction into the high velocity accelerator.

According to another preferred embodiment, the method further comprises a step where the aqueous slurry enters into the high velocity accelerator which induces a state which rapidly reduces the effects of gravity and friction and generates a highly turbulent flow state of the suspension while simultaneously applying energy to create a state of rapid acceleration in a vacuum state.

According to another preferred embodiment, the method further comprises a step where the material bulk mass enters the first stage of the Rapid Material Separation System (RMSS) at the inlet of the first cyclone where the material may be entrained with air or some other inert and/or expandable gas.

According to another preferred embodiment, the method further comprises a step where the materials exiting the overflow from the RMSS first stage cyclone in the fifth step are deposited into a blow-off settlement tank where the material will be agitated and transported to the ASSST for further processing.

According to yet another preferred embodiment, the method further comprises a step where the material exiting the underflow of the fifth step will freely fall into a conical hopper that will feed the material into a venturi inductor where the material is drawn in to a pressurized jet stream of water and into a slurry state where the materials are blended, suspended and agitated at a pressure and velocity that may be desired.

According to another preferred embodiment, the method further comprises a step where the material bulk mass enters the second stage of the RMSS at the inlet of the first cyclone where the material may be entrained with air or some other inert and/or expandable gas.

According to yet another preferred embodiment, the method further comprises a step where the materials exiting the overflow from the RMSS second stage cyclone in the eighth step are deposited into a blow-off settlement tank where the material will be agitated and transported to the Accelerated Solid Separation and Settlement Tank (ASSST) for further processing.

According to another preferred embodiment, the method further comprises a step where the material that exits the underflow from the RMSS second stage cyclone falls freely into a container which may be equipped with a method for extracting solid materials separately from liquid materials that are free and not trapped as saturation of solid materials. In some cases, the container may be equipped with a method of transporting liquids to the ASSST for further processing.

According to yet another preferred embodiment, the method further comprises a step where liquid materials and liquid materials containing suspended solids collected in the mixing tank from step 1 may be transported to the ASSST for further processing.

According to another preferred embodiment, the method further comprises a step where solid materials may be transported with a wet screw that is equipped with pressurized water jets to clean and remove any unwanted residue from the solids.

According to another preferred embodiment, the method further comprises a step where liquid materials that are free and not trapped as saturation of a solid material is transported from the collection container, as described in the tenth step, to the ASSST for further processing. In some cases, the liquid materials may contain small amounts of suspended solids.

According to another preferred embodiment, the method further comprises a step where the aqueous slurry which may be transported from, the container as described in the thirteenth step, or a settlement tank as described in step 1, to the ASSST inlet may be agitated, singularly or in a combination of, mechanical agitation and/or agitation caused by the injection of air.

According to yet another preferred embodiment, the method further comprises a step where materials that are lighter than water are removed from the ASSST as described in the fourteenth step and transported to a containment tank for final disposition or additional treatment processes as may be required by the user.

According to another preferred embodiment, the method further comprises a step where water is transported from the ASSST, at a volume rate which may be consistent with the volume rate of the inflow material other than the material that is lighter than water or the volume of the sediments and solids, or at a flow rate or volume of flow that would maintain a level in the ASSST consistent with a minimum and/or maximum height of liquid in the ASSST.

According to another preferred embodiment, the method further comprises a step where water is transported to the aqueous slurry settlement and flotation cell system (ASFS) where it may be possible to further separate sediments and solids and lighter than water liquids from the water.

According to another preferred embodiment, the method further comprises a step where the lighter than water materials which are floating on the surface of the water of the ASFS are skimmed from the water surface in a manner that is free flowing and which would encourage a minimum level of lighter than water materials to remain in place.

According to another aspect of the present invention, there is provided a method of removing oil contaminants on solid particulates comprising the steps of:
 a) using a liquid such as water to create an aqueous slurry of the contaminated solids;
 b) processing the slurry in a high velocity accelerator which uses high velocity water streams to cause separation of particulates and oil contaminant and further result of dissimilar liquid separation and dissimilar particulate separation through the induction of a state where liquids vaporize;
 c) separating solid particulates from other components in the liquid flow; and
 d) a series of separation modules which receives the output of the apparatus and separates solids, liquids and gases according to their density.

According to another preferred embodiment, the method further comprises a process step which captures, recycles, cleans and reuses water used in the preparation of the aqueous slurry.

According to yet another aspect of the present invention, there is provided a method of removing oil contaminants on contaminated solid particulates comprising the steps of:

a) using water at a temperature below standard how water extraction process temperature to create an aqueous slurry of the contaminated solids;
 b) processing the slurry in a high velocity accelerator which uses high velocity water streams to cause separation of particulates and oil contaminants;
 c) separating solid particles from other components in the liquid flow; and
 d) a series of separation modules which receives the output of the apparatus and separates solids, liquids and gases according to their density.

Preferably, the processing of the slurry into the high velocity accelerator results in the vaporization of low boiling point contaminants from the particulates.

Preferably, the liquid used in creating a slurry comprising waste material is selected from the group consisting of: water; lighter-than water solvents; combinations thereof. Water is more preferred.

BRIEF DESCRIPTION OF THE DRAWINGS

The following figures form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention.

DETAILED DESCRIPTION OF THE INVENTION

As used herein, certain terms have the meanings defined below. All other terms and phrases used in this specification have their ordinary meanings as one of skilled in the art would understand.

According to one aspect of the present invention, there is provided a method of cleaning solids to be free of, or separating solids from, viscous materials and in some cases other solids such as, but not limited to resins and other coatings, foreign debris, clays, silts, contaminated water or chemicals and in other cases separating some liquids form some other liquids. The contaminated solids may comprise any solid such as sand, clay, soil, or other particulate solids, or mixtures thereof, regardless of the source of the solid and the contamination.

Figure 1:
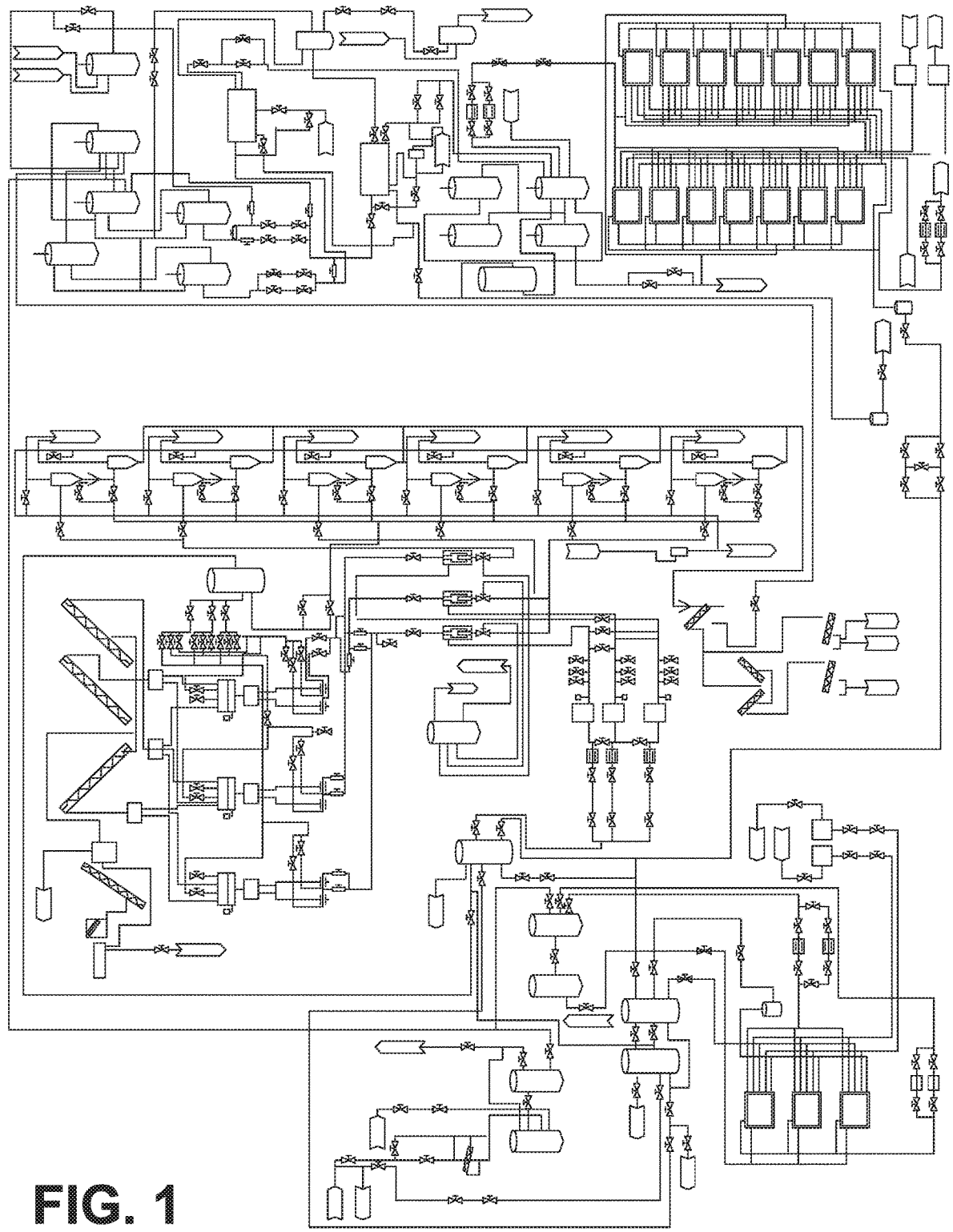
FIG. 1 shows a process flow diagram of a permanent process facility employing the process according to a preferred embodiment of a method of the present invention.
Figure 2:
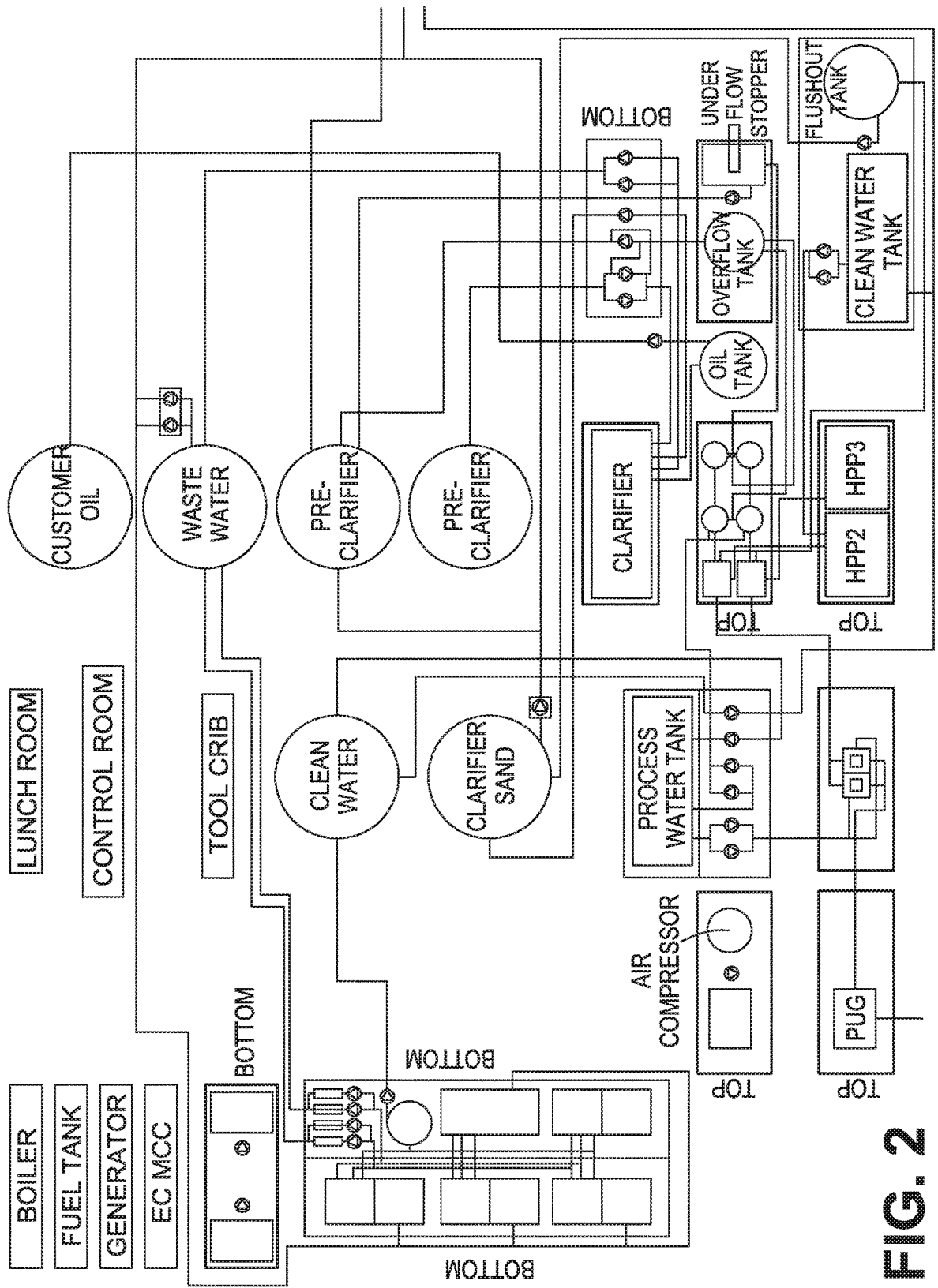
FIG. 2 shows a mobile of portable method set-up according to a preferred embodiment of the present invention.

According to another aspect of the present invention, there is provided a system for cleaning solids to be free of, or separating solids from, viscous materials and in some cases other solids such as, but not limited to resins and other coatings, foreign debris, clays, silts, contaminated water or chemicals and in other cases separating some liquids form some other liquids. The contaminated solids may comprise any solid such as sand, clay, soil, or other particulate solids, or mixtures thereof, regardless of the source of the solid and the contamination. FIG. 1 illustrates a process flow diagram of a permanent process facility employing the process according to a preferred embodiment of a method of the present invention. The plant would have the capacity to treat 40 m3 of oil waste sand per hour.

The contaminant may comprise any viscous and unwanted or foreign substance which is mixed with the solids, and/or coated or adhered onto the surface of the solid material. In one exemplary implementation, the contaminated solid comprises waste material from oil and gas operations, which comprises primarily of sand contaminated with hydrocarbons. Other contaminated solids may include, without limitation: oil waste sand and clays; oil waste pond water and materials; chemical and petrochemical materials in sands, clays or other earth materials; gaseous materials from decomposing or decomposed waste, whether residential waste, sewage waste or industrial waste.

It is believed that the primary industry segments which may benefit from use of the invention include oil waste products from the oil and gas industry, environmental remediation industry where land reclamation includes the removal of hydrocarbons, petrochemicals, foreign toxic debris or other chemicals and municipalities where there is an intent to capture and reclaim or safely dispose of storm water sands or road sands.

In each instance, the application of a method and system according to a preferred embodiment of the present invention may be incorporated into various applications within the extraction, refining, processing, transportation, handling or disposition processes of the oil and gas industry to eliminate the waste products closer to their creation point as effectively and efficiently as it may be applied to the processing of the waste products at the disposition point of the user process.

According to a preferred embodiment of the process according to the present invention, the process can be incorporated into various application within the environmental remediation industry or municipal infrastructure where applicable. Preferably, the process can be incorporated at any number of process volume rates and may be incorporated in both permanently located and mobile or semi-mobile processes in any applicable application.

According to a preferred embodiment of the process according to the present invention, it may be operated as a batch process, either as a fully mobile or semi-mobile implementation, or in a permanently installed facility. According to another preferred embodiment of the process according to the present invention, it may be operated as a continuous flow-through process, either as a fully mobile or semi-mobile implementation, or in a permanently installed facility.

Preferably, systems may be scalable to suit a required application capacity as defined by the user and has the capacity to operate with no change in effectiveness of process at efficiency ranges of 10% to 100% and further with any variation of proportion of solid particles to liquid parts.

Preferably, the effectiveness and process of the system is not dependent on the introduction or use of chemical aids or surfactants, although there may be applications where chemical use is desired to modify a specific intended result. The system may be configured to incorporate the introduction of chemicals as required or desired by the user, at different entry points in the process.

According to a preferred embodiment of the present invention, the system may promote mechanically-induced chemical reactions which assist in the separation of various materials from each other. These chemical reactions may be naturally occurring by mechanical induction and do not produce any substantial negative or by-product based residual effect at any point in the process, or by the end of the process.

Variations of embodiments of the invention process can be applied to a number of uses and industries. The various preferred embodiments configuration of the invention may vary to include supportive or additional user required classification and/or treatment of materials.

Figure 4:
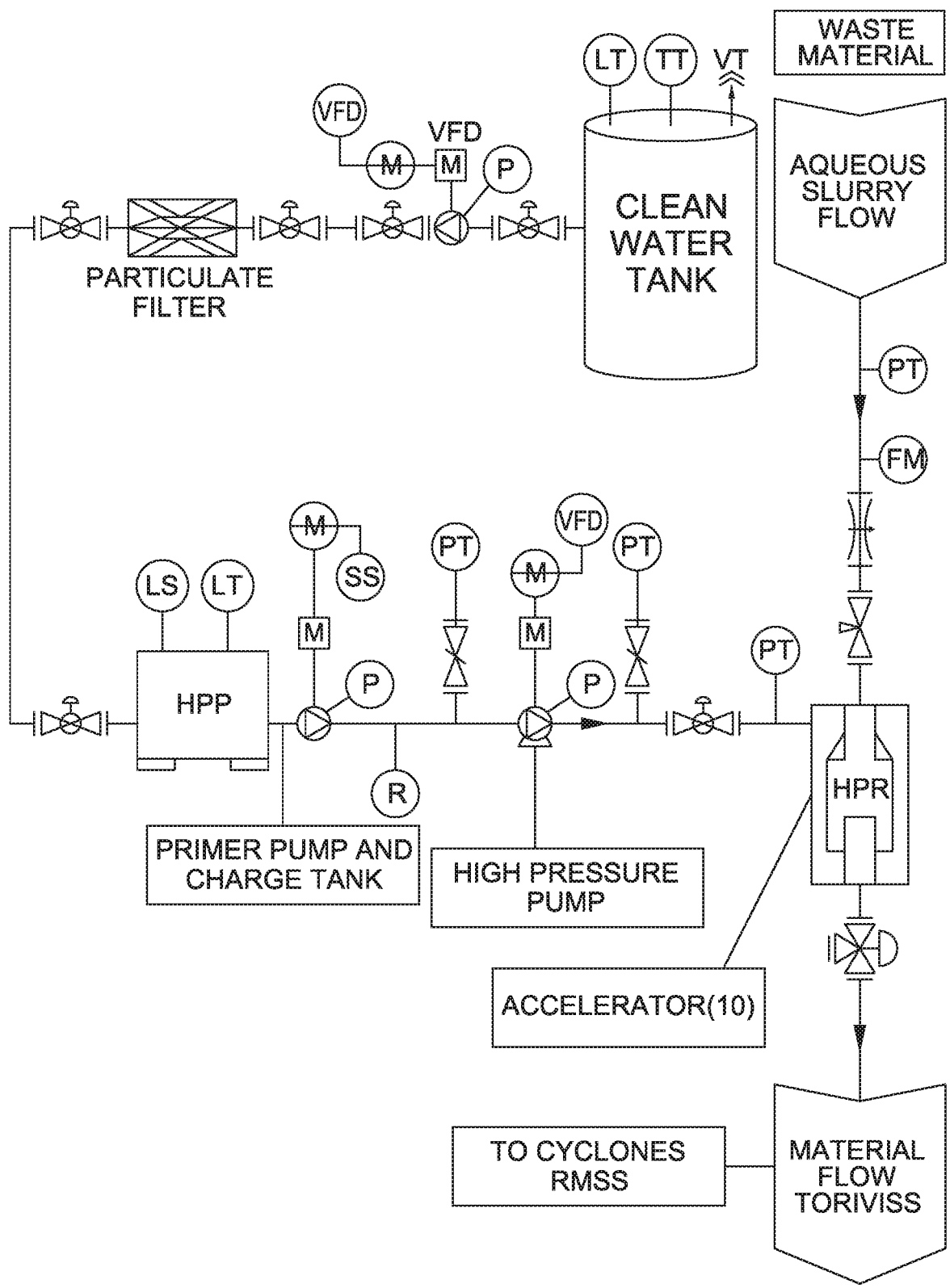
FIG. 4 shows a system set-up according to a preferred embodiment of the present invention comprising a high velocity accelerator system process.
Figure 5:
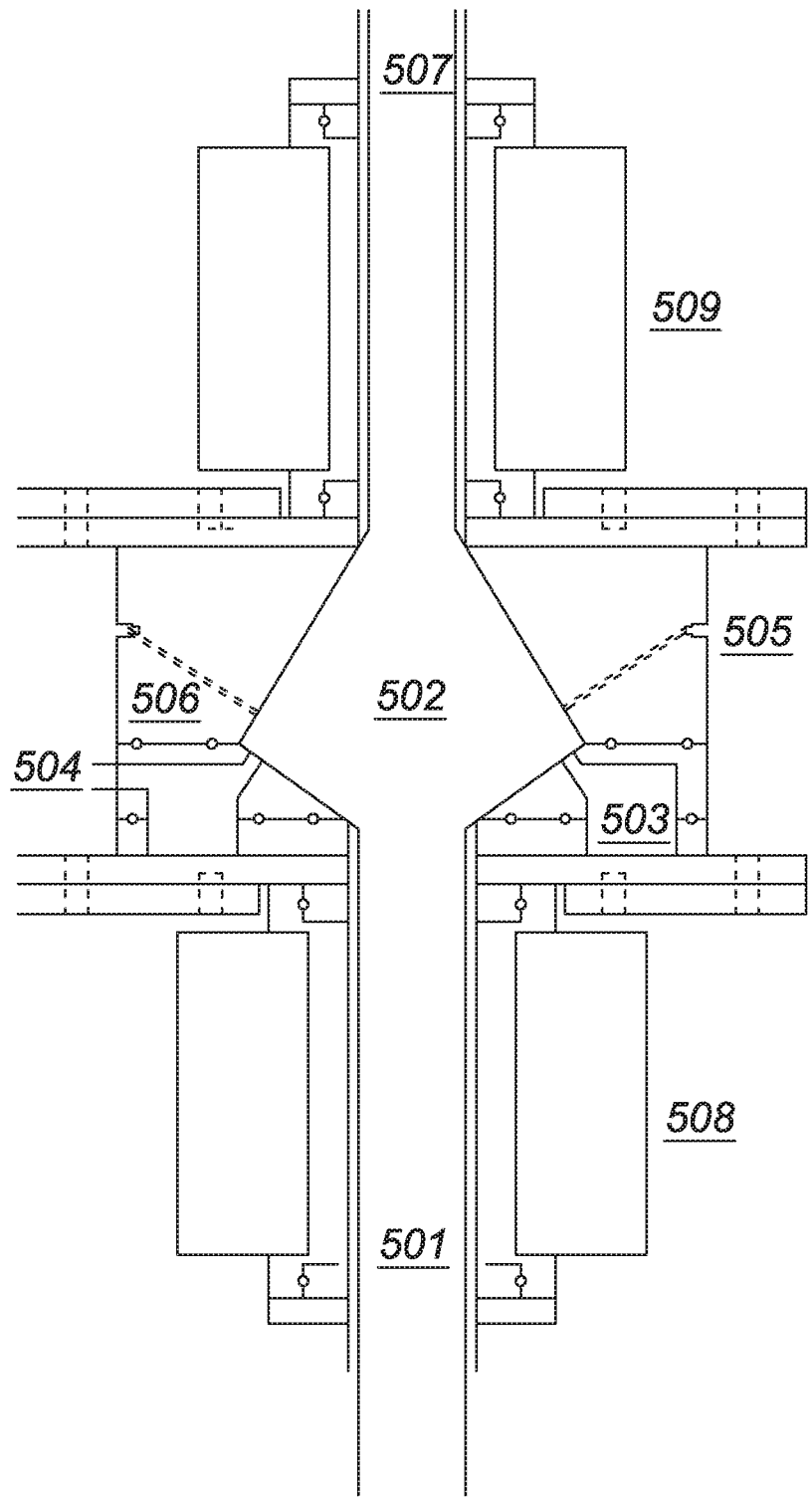
FIG. 5 is a cross-sectional view of the high velocity accelerator system as used in the process according to a preferred embodiment of a method of the present invention.
Figure 6:
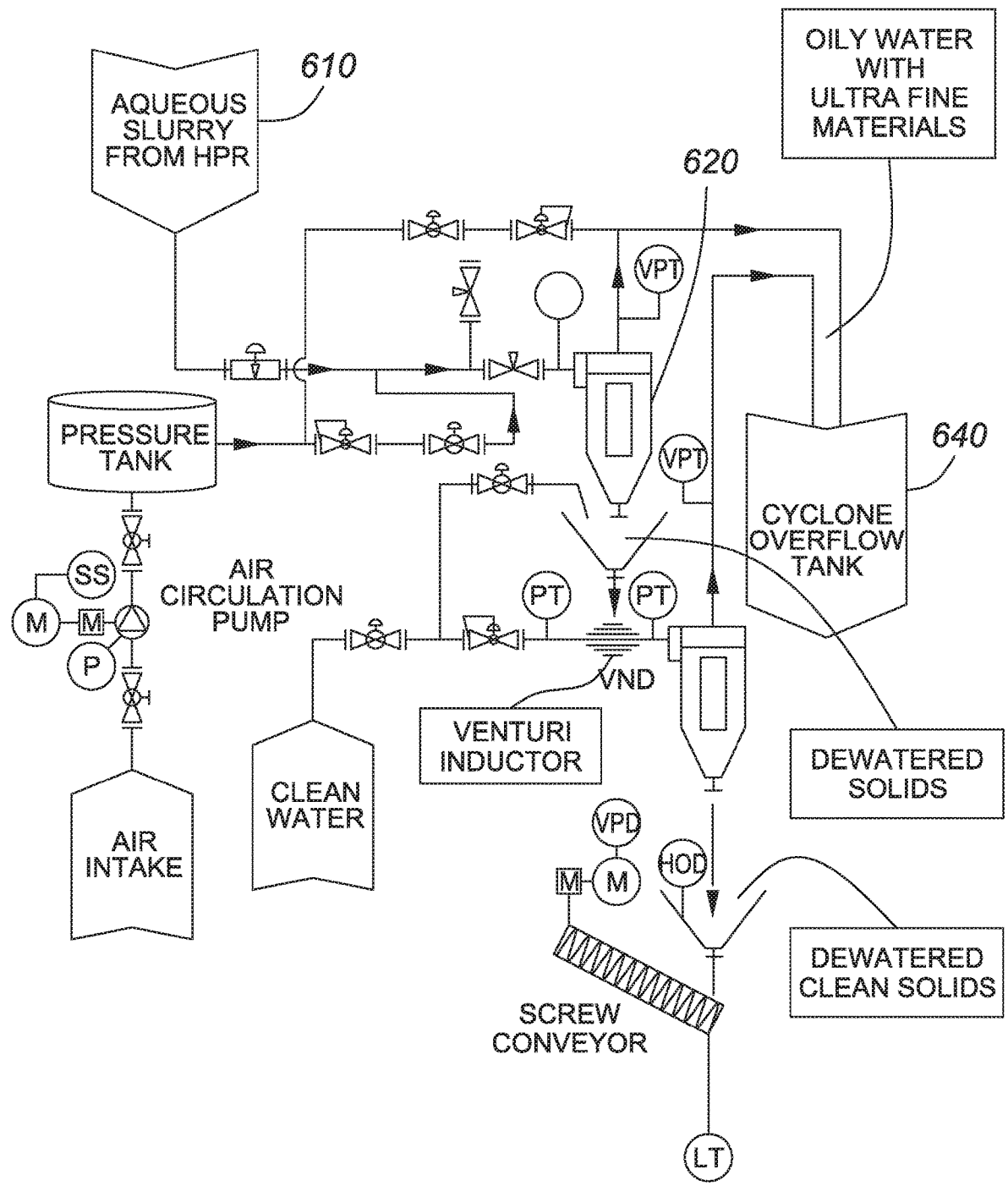
FIG. 6 shows a system set-up according to a preferred embodiment of the present invention comprising the rapid material separating system.
Figure 7:
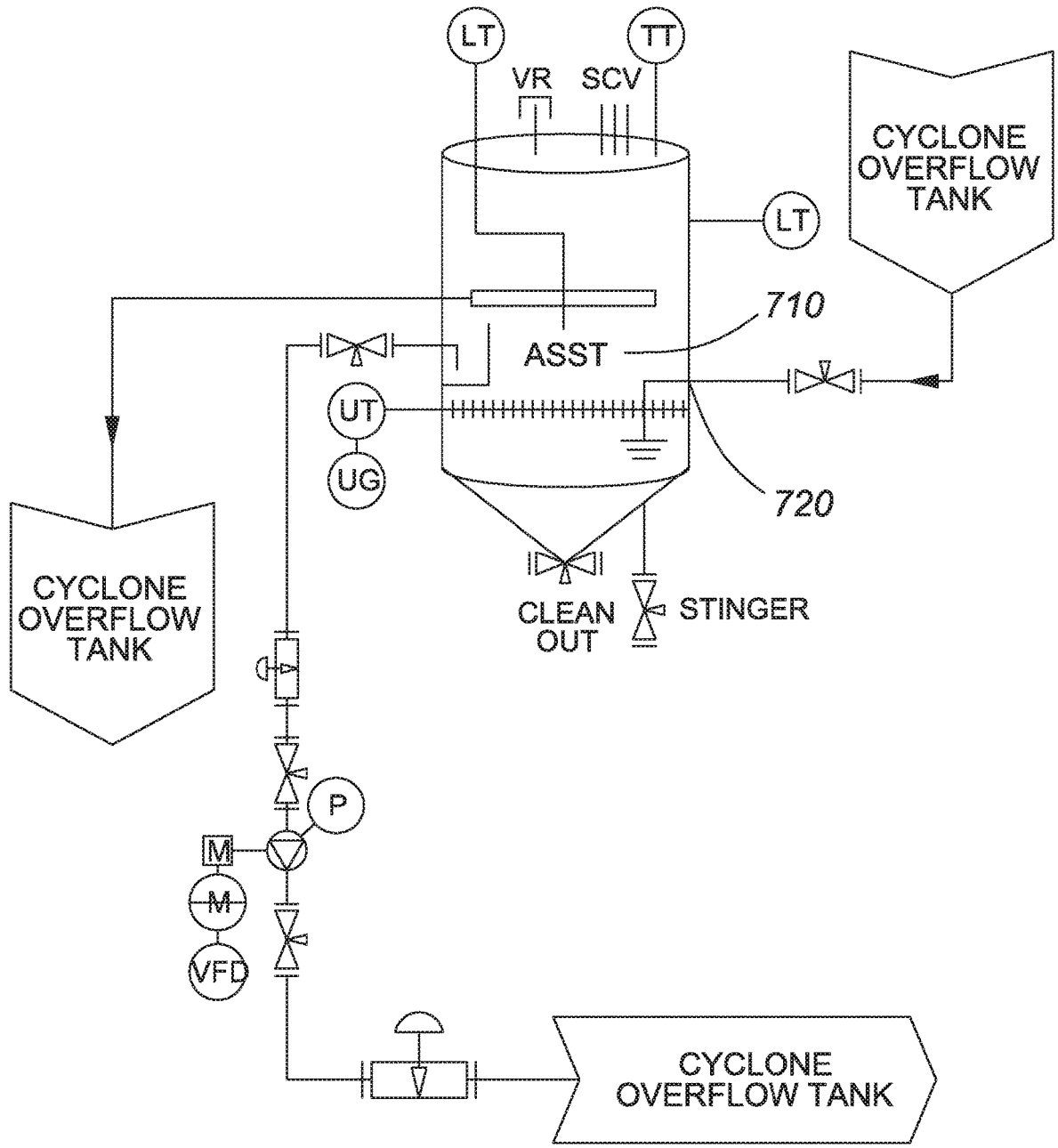
FIG. 7 shows a system set-up according to a preferred embodiment of the present invention comprising an accelerated solid separation and settlement tank.
Figure 8:
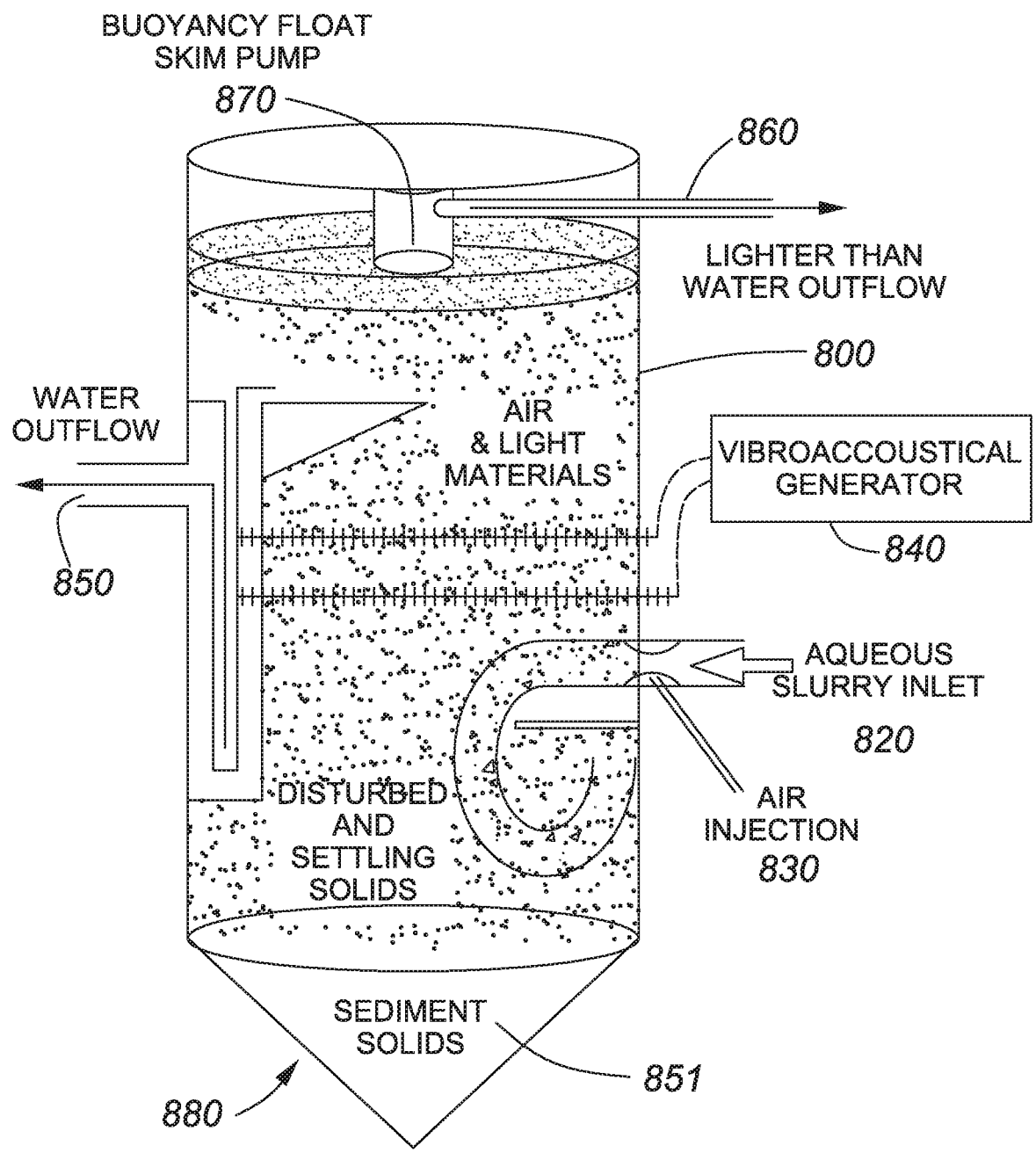
FIG. 8 is a cross-sectional side view of an accelerated solid separation and settlement tank assembly diagram according to a preferred embodiment of the present invention.
Figure 9:
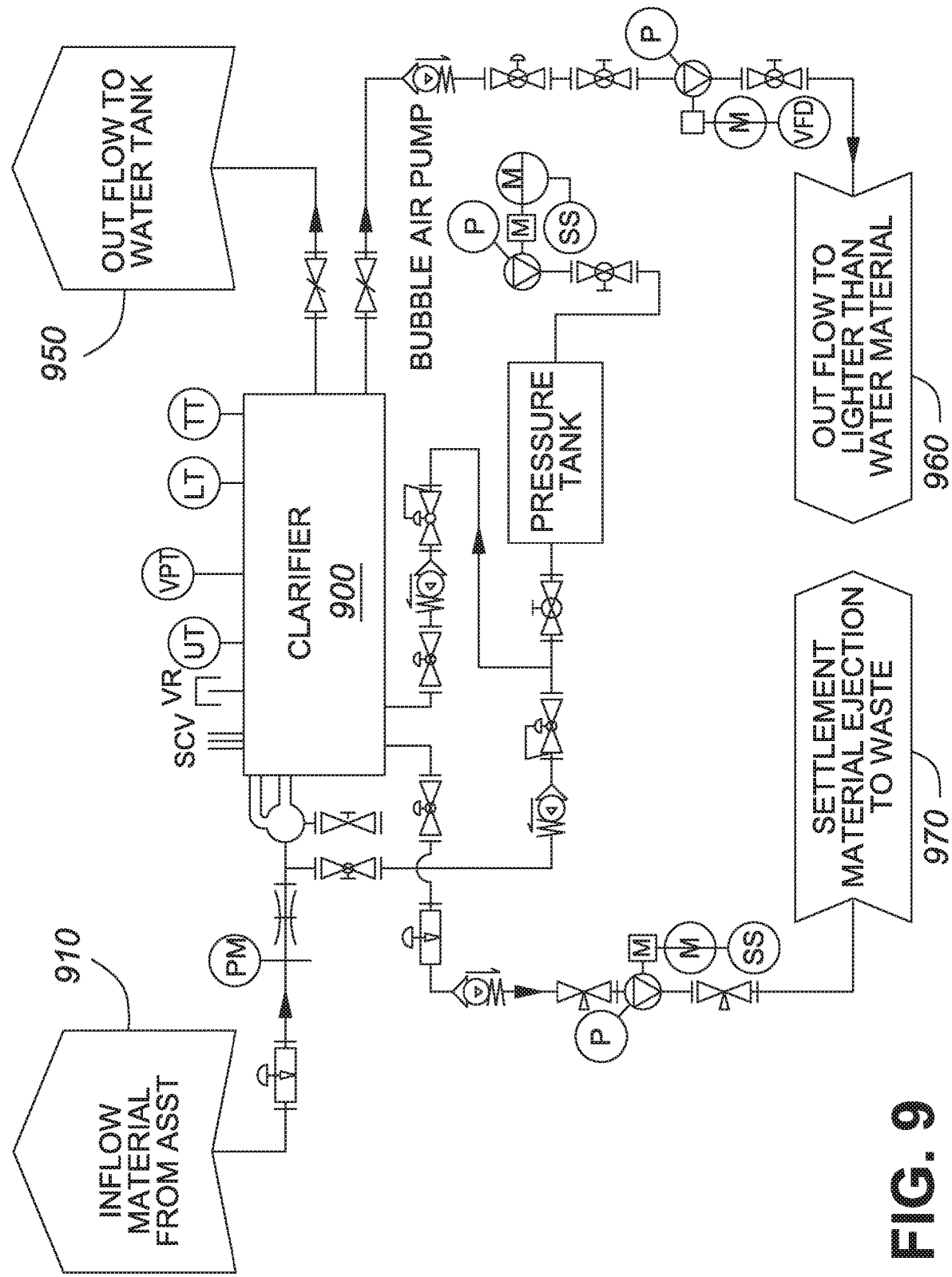
FIG. 9 shows a system set-up according to a preferred embodiment of the present invention comprising the aqueous slurry settlement and flotation cell system (ASFS—a clarifier)
Figure 10A:
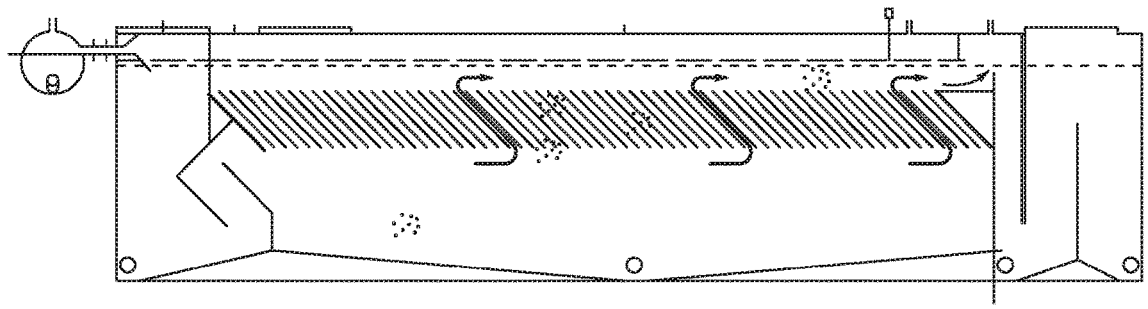
FIGS. 10a, 10b and 10c are side views of the aqueous slurry settlement and flotation cell system assembly.
Figure 10B:
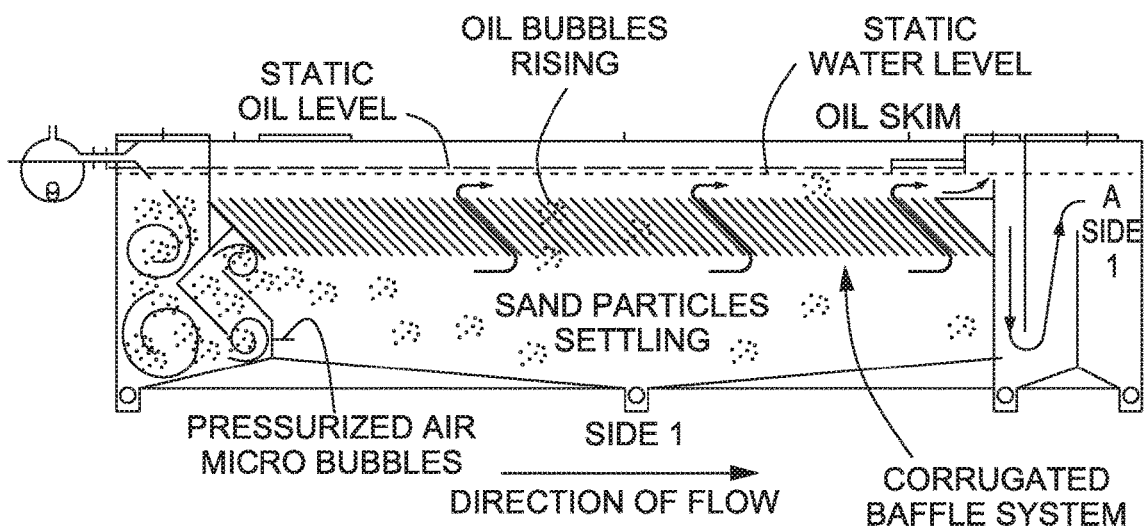
Figure 10C:
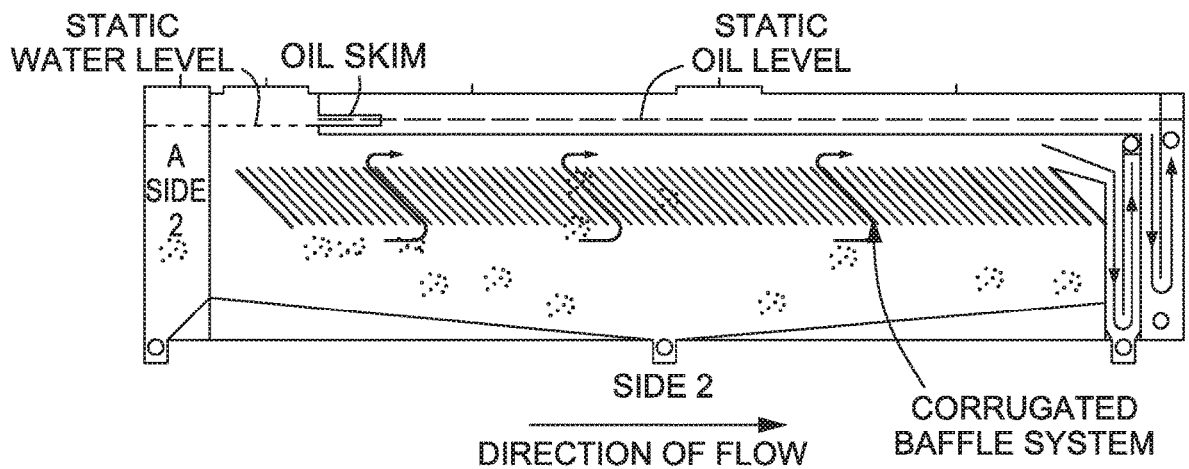

According to a preferred embodiment of the present invention, the system that is intended to be a permanent facility based application can include one or several of the following components, which are described herein by their function: high velocity accelerator system (HVA) (as illustrated in FIG. 4 and FIG. 5); a rapid material separation system (RMSS)—(as illustrated in FIG. 6); an accelerated solid separation and settlement tank (ASSST)—(as illustrated in FIG. 7 and FIG. 8); and an aqueous slurry settlement and flotation cell system (ASFS)—(as illustrated in FIG. 9 and FIG. 10).

As illustrated in FIG. 5, there is a lengthwise cross-sectional view of the HVA used in the process according to a preferred embodiment of the present invention. The material inflow pipe (501) is in fluid operational connection with the internal apparatus chamber (502). The size and configuration of the apparatus' internal chamber (502) is determined by the intended application. There is a pressurized fluid chamber (503) which is in operational fluid connection with the internal chamber (502). There is also an inlet (504) for the pressurized fluid chamber (503), the fittings of which are also determined by the requirements of the intended application. There are high pressure seals (506) found around the internal apparatus chamber (502). A gas or air inlet (505) is located in fluid operational connection to the internal apparatus chamber and is used depending on the needs and requirements of the application. The outflow pipe (507) is in fluid operational connection with the internal chamber (502). According to a preferred embodiment, an eddy current or magnetic apparatus may be located at the inflow section (508) of the apparatus. According to another preferred embodiment, an eddy current or magnetic apparatus may be located at the outflow section (509) of the apparatus.

According to a preferred embodiment of the present invention, the process includes a first step where aqueous material is introduced into a mixing tank where materials are easily separated into free liquid and saturated solids. The saturated solids are extracted from the tank and then mixed with sufficient water to produce a transportable and treatable slurry which may optionally include chemical process aids if such are desired. The liquids separated from the saturated solid materials may have suspended solid fine particles or other contaminants such as chemicals, and are treated in parallel but separately from the saturated solids.

In the first step of a preferred embodiment of the present invention, saturated material with a low volume of free liquid is placed into a container or containment. The saturated solids are extracted from the tank and then mixed with sufficient water to produce a transportable and treatable slurry which may optionally include chemical process aids if such are desired. The liquids separated from the saturated solid materials may have suspended solid fine particles or other contaminants such as chemicals, and are treated in parallel but separately from the saturated solids.

According to a preferred embodiment of the present invention, the process includes a second step involving mixing saturated solids or saturated solids with minimal volumes of liquids with water to form a flowable, transportable aqueous slurry that is blended to an average consistency and to ensure solids remain suspended in the slurry for introduction to the high velocity accelerator.

According to a preferred embodiment of the present invention, the process includes a third step, where the aqueous slurry of material and water passes through a venturi inductor which uses pressurized water flow to re-suspend and blend the slurry to a desired density, pressure, velocity, temperature and/or other parameters which may be desired for introduction into the high velocity accelerator.

According to another preferred embodiment of the present invention, the process includes a fourth step, the aqueous slurry enters into the high velocity accelerator which induces a state which rapidly reduces the effects of gravity and friction and generates a highly turbulent flow state of the suspension while simultaneously applying energy to create a state of rapid acceleration in a vacuum state.

The environmental conditions within the high velocity accelerator which are implied as a result of material displacements at given points in the reaction, on the material both decreases the pressure and increases the velocity of the suspension equally to the material as a singular mass, but imparts specific and different actions to the individual material components, the extent of which is determined by the individual material component physical characteristics. As a result, the HVA outputs a high-energy material flow, which assists in maintaining separation as it passes to a subsequent process for further separation and segregation of the material components. The material may flow in a state where individual material components will flow as individual masses and at different velocities within the bulk mass.

High Velocity Accelerator HVA (Also Referred to as the STERN Reactor System)

In an implementation of the apparatus according to a preferred embodiment of the present invention as part of a process, a material slurry enters the STERN reactor system (HVA), which induces a state which reduces effects of gravity and friction and generates a highly turbulent flow state of the suspension while simultaneously applying energy to create shear forces and vacuum states which act on the various components of the suspension, which encourages rapid separation of the various components of the suspension.

Entry of material into the HVA during operation results in a pressure drop and rapid increase in the velocity of the suspension equally to the medium as a singular mass, but imparts specific and different actions to the individual medium components. As a result, the HVA outputs a high-energy material flow, which assists in maintaining separation of material components as they pass to a subsequent separator or settlement treatment system.

The HVA may separate individual material components from each other and flow them forward as a bulk mass however, individual material components will flow as individual masses and at different velocities within the bulk mass. The variation of velocities may be dependent on the temperature, pressure and specific densities of each of the individual materials. Preferably, a high velocity accelerator comprises:

an internal chamber;
a material inlet port;
a material outlet port;
a back wall surrounding the inlet port;
an internal wall having a first end connected to the back wall and a second opposite end tapering to the outlet port, the first end being located proximate the inlet port and the second end being located proximate the outlet port;
a plurality of injection ports positioned along the periphery of the internal wall proximate the first end;

wherein said inlet port having a diameter smaller than the diameter of the internal chamber, and the injection ports are adapted to inject at a high rate of displacement a fluid which, in operation, will create a vortex inside the chamber thereby entraining a material towards the outlet port.

FIG. 5 illustrates a lengthwise cross-sectional view of the apparatus according to a preferred embodiment of the present invention. The material inflow pipe (501) is in fluid operational connection with the apparatus' internal apparatus chamber (502). The size and configuration of the internal apparatus chamber (502) is determined by the intended application. There is a pressurized fluid chamber (503) which is in operational fluid connection with the internal chamber (502). There is also an inlet (504) for the pressurized fluid chamber (503), the fittings of which are also determined by the requirements of the intended application. There are high pressure seals (506) found around the internal chamber (502). A gas or air inlet (505) is located in fluid operational connection to the internal apparatus chamber and is used depending on the needs and requirements of the application. The outflow pipe (507) is in fluid operational connection with the internal chamber (502). According to a preferred embodiment, an eddy current or magnetic apparatus may be located at the inflow section (508) of the apparatus. According to another preferred embodiment, an eddy current or magnetic apparatus may be located at the outflow section (509) of the apparatus. The jets are aimed along the conical inner surface to create high velocity streams which collide at the apex of the HVA. In one embodiment, the jets may be aimed slightly tangentially so that the high velocity streams spiral along the inner surface, creating a central vortex in the chamber. By operation of the venture principle, a low-pressure zone is created in the central volume of the internal chamber of the HVA.

Vacuum states may form areas of space within the apparatus which may be void of liquid and/or solid materials such as in areas like, the core of the conical flow and/or in the area above the jet stream and between the jet stream an inner conical surface of the apparatus, as depicted in FIG. 5. As a result of the high energy cavitation forces imparted to the system by the high velocity water streams, the particles in suspension will collide with each other, particularly at the apex of the vortex where the particles will have concentrated, as shown schematically in FIG. 3. The collisions occur with sufficient energy to fracture weaker state particles. All particles will undergo surface rounding, increasing the sphericity of the individual particles and the compressive strength of the bulk mass. Individual particles will undergo directional changes, rotational velocity and momentum changes as they accelerate, collide and are compressed in the vortex.

As the solid particles are buffeted in the vortex, contaminants, which adhere to the particles' surfaces, are dislodged. As such, contaminants will typically be less dense, they will migrate outwards and move with the liquid mass. Clay particles such as bentonite or other porous and or adherent type contaminants are also dislodged and flow freely in the liquid mass. Slag type materials are also dislodged but may become entrapped in the flow of other solids and can be separated, if desired, in secondary treatments.

Generally, components with higher density will concentrate in the center of the vortex, while lighter density components will migrate to the outer zones. Materials that may vaporize in the apparatus process may condense at points of the process where there is an increase in pressure to a point where the state of vacuum is no longer sufficient to maintain the material in a vaporized state.

According to a preferred embodiment of the present invention, at some points in the process of using the apparatus the increase in pressure may be sufficient to cause all vaporized liquids to condense. In some cases, materials that vaporize into a gaseous state may not condense as pressure increases. Notwithstanding any theory the conclusion is specific to specific physical characteristics and properties of some materials. At a point where vaporized materials condense, the action will generate an effect commonly referred to by persons skilled in the art, as a "water hammer". The term "water hammer" is not intended to describe an effect specific to water and may describe different materials condensing. Notwithstanding any theory, it is believed the effect of "water hammer", occurring at points where there may be a rapid compression and deceleration of materials, may produce either supersonic and/or subsonic shockwaves.

According to a preferred embodiment of the present invention, the process can generate material velocities which are supersonic.

According to a preferred embodiment of the present invention, at a point where all materials in the apparatus process are condensed to a maximum density and at a point where the material is condensed in to the smallest flow area of the process, the total sum of the energy of the process may be imparted on the material in a forward direction. Simultaneously, shockwaves will impart forces on the material consistent with energy disbursement laws and impart forces in both, a forward direction, and away from the condensed material.

According to a preferred embodiment of the present invention, where the material is condensed to a maximum density within the process, is the outflow point of the material from the apparatus, the forces imparting on the material may transport the materials forward in a spiral motion. Preferably, materials in the process which remain in a vaporized state may expand outwardly. Preferably also, materials in the process which are liquid and emulsified with dissolved air and/or other gaseous may expand outwardly at a rate consistent with the laws of expanding fluids and fluids with dissolved air and/or gases.

Figure 3:
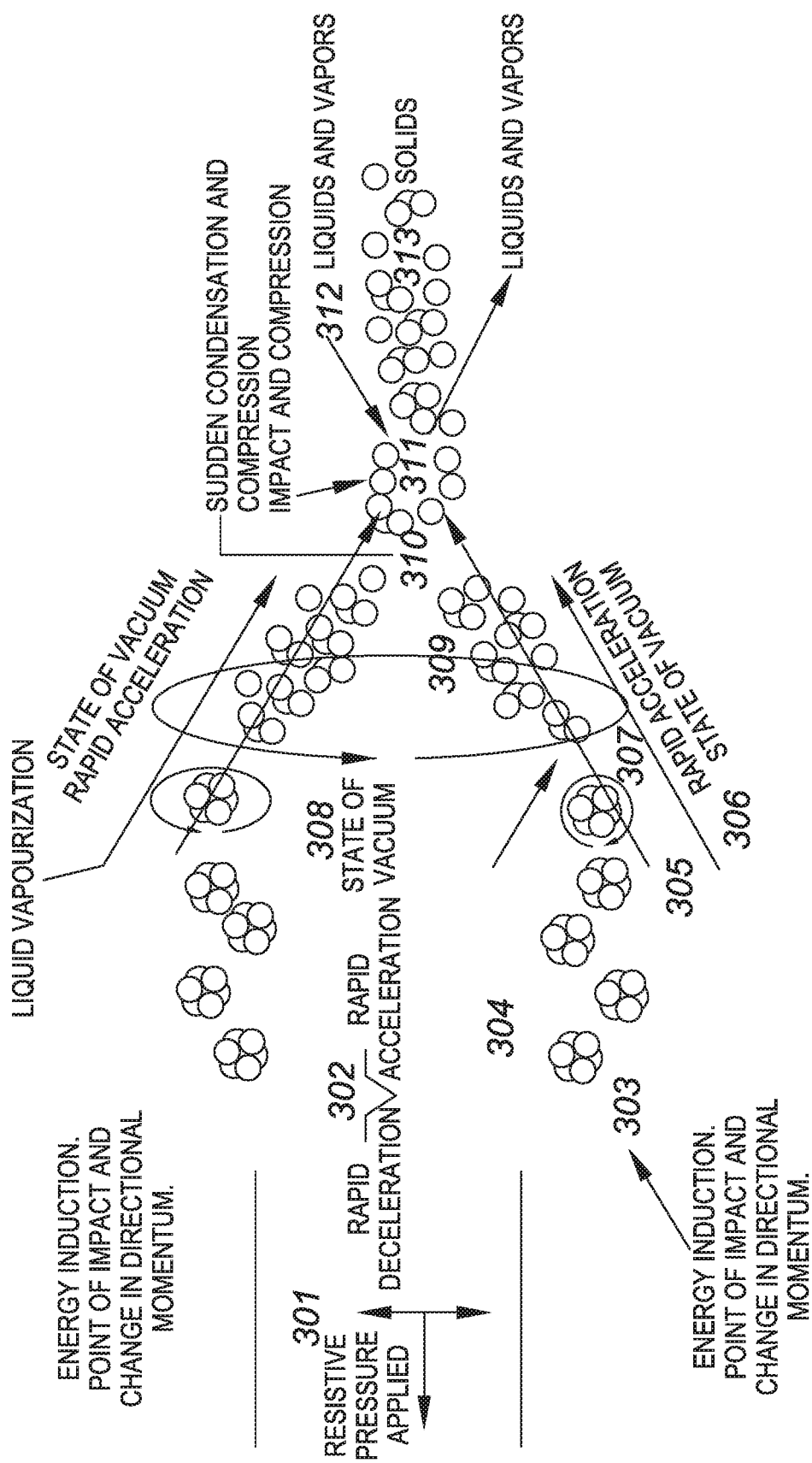
FIG. 3 is a schematic of the physical forces imparted on the aqueous solution and solids in the first phase of separation according to a preferred embodiment of a method of the present invention.

Solid materials in the materials which are condensed may have forces imparted onto the materials which propel the material forward in a spiral motion and at a velocity which may not be consistent with liquid or vapor components of the material as described in FIG. 3. Material components which may be able to disburse imparted forces may not propel forward at velocities consistent with materials which may not disburse imparted forces at the same values. Notwithstanding any theory, it is believed materials which are propelled forward at lower velocities than other materials will be imparted by centripetal forces to a greater degree than materials with more forward velocity such as solid materials. Materials moving forward at lower velocities and imparted by centripetal forces to a greater degree may continue to expand outwardly and rapidly decrease in forward velocity.

According to the preferred embodiment illustrated in FIG. 5, the inlet pipe (501) leads to an inlet transition zone where the internal diameter of the reactor increases and liquid and/or semi liquid states begin to vaporize and, in some cases, to completely vaporize. It is understood that the inlet pipe may protrude into the reactor chamber according to an embodiment of the present invention, without departing from the person skilled in the art's understanding that the back wall surrounds the inlet port.

As illustrated in FIG. 3, when the suspension (301) enters the inlet transition zone (302), it rapidly decelerates with a resultant increase in pressure and coinciding loss of pressure due to expansion of liquid materials (303) in the internal chamber (304) where a state of vacuum (308) exists. It is then very rapidly accelerated by the action of the high velocity water streams towards the apex (311). Thus, the suspended material is displaced into the apex by the action of the high velocity streams (305) along the walls (306) where the particles converge towards the apex while rotating on themselves (307) and in the vortex (309). Shear forces are focused at the apex (311) of the vortex (309) and act on the solids which are concentrated there. The inventors surmise that, the particles condense and compress (310) at an ideal point of maximum material compression or at an ideal point of expansion of the material after the point of maximum material compression, the material may have the required amount of energy imparted on a substance or body to cause displacement through a conserved level of work power and the imparted work power may be sufficient to propel and/or move a body or object in a forward direction, and/or propel and/or move the apparatus in the opposite direction of the material (liquids and vapors (312) and solids (313)) leaving the apparatus.

The HVA does not create cyclonic separation. In fact, in conventional cyclonic separation, denser material is accelerated by centrifugal force to the periphery, while lighter material collects in the center. In the HVA, the centrifugal forces are overcome and concentrate the denser materials towards the center of the flow and the center of the apex due to an internal vacuum state. Immediately upon entering the HVA chamber, the materials will experience a forward deceleration, but acceleration towards the periphery of the internal chamber, followed by rapid acceleration towards the apex, as the material is sucked into the vortex by the outer low-pressure region created by the high velocity water jets. Upon entry into the lower pressure area of the reaction chamber, the reduced pressure may reduce the friction of the layered flow, producing a highly unstable but directional flow pattern characteristic of a cavitational flow profile.

According to a preferred embodiment of the present invention, material flow patterns may be manipulated with the introduction of an electric and/or magnetic fields generated at the inlet of the chamber with an electromagnet and a rotating ferrous plate. These electric or magnetic fields may encourage a more parallel flow conducive of laminar flow and/or segregation of ferrous materials in the material.

The total energy of the system in the HVA is the sum of the energy of the inflowing suspended material plus the energy imparted by the creation of high velocity water streams. The energy results in a significantly increased velocity of the suspended material, as well as an increase in energy of the solid particles carried in the flowing liquid carrier. Without restriction to a theory, it is believed that the significant energy of the system results in physical actions on the suspended material which results in separation of liquids clinging to the surface of the particles, degasification of liquids, particle size reduction and rounding to due fracturing and abrasive collisions, as may be seen schematically in FIG. 3.

According to a preferred embodiment of the present invention, in the fourth step, the flow material patterns may be manipulated with the introduction of an electric and/ magnetic field generated at the inlet and/or the outlet of the HVA and prior to the RMSS. These electric or magnetic fields may encourage a more parallel flow conducive of laminar flow and/or assist with maintaining segregation of some material components in the material.

According to a preferred embodiment of the present invention, in the fourth step, one or more HVA's connected in series may be configured, where separation of materials requires differing conditions for specific separation goals or effects.

According to a preferred embodiment of the present invention, the process includes a fifth step, the material bulk mass enters the first stage of the RMSS at the inlet of the first cyclone where the material may be entrained with air or some other inert and/or expandable gas. According to a preferred embodiment of the present invention, as the material is entrained with air or some other gas, the cyclone environment will experience an imbalance of pressure which may be an increase in pressure or a decrease in pressure resulting from the entrainment of air or other gas and the physical characteristics of those entrained new materials and which may provide desirable reactions in the cyclone and which may not be consistent with standard cyclonic apparatus design in normal practice.

According to another preferred embodiment of the present invention, in the fifth step, low pressure air is entrained into the material bulk mass which may contain an oil or other chemical and a result in the addition of the entrained air may encourage a greater volume of oil or other chemical to be removed from the process through the overflow of the cyclone while simultaneously causing a greater volume of water to leave the process through the underflow.

According to another preferred embodiment of the present invention, in the fifth step, low pressure air is entrained into the material bulk mass which may contain oil, dissolved or undissolved gas or other chemicals. The addition of the entrained air in addition to air entered into the overflow at a point below the bottom of the underflow and in a direction which may increase the potential for evacuation of materials from the cyclone, may cause a greater degree of oil, gas or other chemical in addition to a greater volume of water to leave the process through the overflow. It is recognized that in some cases the addition of suction on the overflow may cause an increase in the volume of material, normally desired to exit the process through the underflow, to exit through the overflow which may be acceptable in the process assuming the objective is to minimize the volume of materials intended to exit the overflow, from exiting the underflow.

According to a preferred embodiment of the present invention, the process includes a sixth step, where the materials exiting the overflow from the RMSS first stage cyclone in the fifth step are deposited into a "blow off" settlement tank where the material will be agitated and transported to the ASSST for further processing.

According to a preferred embodiment of the present invention, the process includes a seventh step, where the material exiting the underflow of the fifth step will freely fall into a conical hopper that will feed the material into a venture inductor where the material is drawn in to a pressurized jet stream of water and into a slurry state where the materials are blended, suspended and agitated at a pressure and velocity that may be desired. The introduction of the pressurized water flow creates a vacuum feed of the solids and results in a flow of well-mixed and balanced material suspension that may be desired at the entry into a cyclone.

According to a preferred embodiment of the present invention, the process includes an eighth step, where the material bulk mass enters the second stage of the RMSS at the inlet of the first cyclone where the material may be entrained with air or some other inert and/or expandable gas. According to a preferred embodiment of the present invention, in the eight step, the material is entrained with air or some other gas, the cyclone, environment will experience an imbalance of pressure which may be an increase in pressure or a decrease in pressure resulting from the entrainment of air or other gas and the physical characteristics of those entrained new materials and which may provide desirable reactions in the cyclone and which may not be consistent with standard cyclonic apparatus design in normal practice.

According to a preferred embodiment of the present invention, in the eighth step, low pressure air is entrained into the material bulk mass which may contain an oil or other chemical and a result in the addition of the entrained air may encourage a greater volume of oil or other chemical to be removed from the process through the overflow of the cyclone while simultaneously causing a greater volume of water to leave the process through the underflow.

According to another preferred embodiment of the present invention, in the eighth step, low pressure air is entrained into the material bulk mass which may contain oil, dissolved or undissolved gas or other chemicals. The addition of the entrained air in addition to air entered into the overflow at a point below the bottom of the underflow and in a direction which may increase the potential for evacuation of materials from the cyclone, may cause a greater degree of oil, gas or other chemical in addition to a greater volume of water to leave the process through the overflow. It is recognized that in some cases the addition of suction on the overflow may cause an increase in the volume of material, normally desired to exit the process through the underflow, to exit through the overflow which may be acceptable in the process assuming the objective is to minimize the volume of materials intended to exit the overflow, from exiting the underflow.

According to a preferred embodiment of the present invention, the process includes a ninth step, where the materials exiting the overflow from the RMSS second stage cyclone in the eighth step are deposited into a "blow off"

settlement tank where the material will be agitated and transported to the ASSST for further processing.

According to a preferred embodiment of the present invention, the process includes a tenth step, where the material that exits the underflow from the RMSS second stage cyclone falls freely into a container which may be equipped with a method for extracting solid materials separately from liquid materials that are free and not trapped as saturation of solid materials. In some cases, the container may be equipped with a method of transporting liquids to the ASSST for further processing.

According to a preferred embodiment of the present invention, the process includes an eleventh step, where liquid materials and liquid materials containing suspended solids collected in the mixing tank from step 1 may be transported to the ASSST for further processing.

According to a preferred embodiment of the present invention, the process includes a twelfth step, where solid materials captured in the container in the tenth step are transported to a treated solids pile.

According to a preferred embodiment of the present invention, in the twelfth step, solid materials may be transported with a wet screw that is equipped with pressurized water jets to clean and remove any unwanted residue from the solids.

According to a preferred embodiment of the present invention, the process includes a thirteenth step, where liquid materials that are free and not trapped as saturation of a solid material is transported from the collection container, as described in the tenth step, to the ASSST for further processing. In some cases, the liquid materials may contain small amounts of suspended solids.

It may be beneficial to the process if materials transported to the ASSST are done so with as little pressure and velocity as attainable so as to minimize the amount of energy introduced into the ASSST as a direct result of transportation of the materials and so as to reduce emulsification of the aqueous slurry flow.

According to a preferred embodiment of the present invention, the process includes a fourteenth step, where the aqueous slurry which may be transported from, the container as described in the thirteenth step, or a settlement tank as described in step 1, to the ASSST inlet may be agitated, singularly or in a combination of, mechanical agitation and/or agitation caused by the injection of air.

According to a preferred embodiment of the present invention, as illustrated in FIG. 7, in the ASSST inlet (720), a mechanical process may cause the rapid expansion and contraction of liquid materials which may cause materials such as oil or other materials with low boiling points to expand and where air is injected into the material in a manner that is intended to displace materials, at the maximum expansion point which may be mechanically produced, through a constricted flow area, that then rapidly expands into an eccentric opening, materials may experience varying states of vaporization and subsequently rapid condensing upon entry into the ASSST.

Cavitation of some materials at the inlet (720) of the ASSST (710) may further cause rapid pressure losses of the material in addition to pressure losses which are conducive to expanding liquid materials.

In some cases, where the materials contain material components which have a lower specific gravity than water at a given temperature, the reaction of expansion and contraction, combined with the entrainment of air (830) causing further cavitation of a material component, may cause suspended solids and water to settle away from the lighter liquid material as the liquid material in cavitation rises to the surface of the water in the ASSST with the entrained air. Material flow (820) into the ASSST (800) may cause disturbance of sediment solids at the bottom the tank and/or agitate the aqueous material in the tank and prevent the settlement of solids and/or the floatation of materials which have a specific gravity lighter than water at a certain temperature.

A zonal area within the ASSST, at a desired vertical distance above the material inlet point, is imparted with densely formed vibroaccoustic waves which are low frequency sinusoidal waves and are designed to collide and distort in a downward angle. Vibroaccoustic waves generated by a vibroaccoustic generator (840) in water may add to the energy of other currents in the water and where currents are in opposing directions of the vibroaccoustic waves may cause the energy in the water currents to disperse.

Methods of impeding currents in water may cause a reduction in the effects of forward momentum in maintaining suspension of solids in water. Methods of impeding currents in water may cause a reduction in the effects of forward momentum of lighter liquids and allow the lighter liquids to rise to the surface of the water in a shorter time than if the lighter liquids were imparted by subsurface currents or eddy currents.

According to a preferred embodiment of the present invention, the ASSST where it is desired to separate lighter fluids from the water a floating device (870) may be used to allow lighter liquids to enter the device intake and be transported (860) to a tank for final disposition or further refinement if the user intends.

According to a preferred embodiment of the ASSST as illustrated in FIG. 8 where it is required to remove the settlement and/or solids (851) from the bottom (880) of the tank (800), the ASSST may be equipped with a method of extracting the sediments and/or solids from the tank without having to remove the liquids and in a manner which would restrict liquids from being extracted with the sediments and/or solids. An example of this method may be a wet screw auger which is designed specifically to extract solids from liquids while simultaneously restricting the amount of liquid that is removed with the solids and/or sediments.

According to a preferred embodiment of the present invention, the process includes a fifteenth step, materials that are lighter than water are removed from the ASSST as described in the fourteenth step and transported to a containment tank for final disposition or additional treatment processes as may be required by the user.

According to a preferred embodiment of the present invention, the process includes a sixteenth step, where water is transported from the ASSST, at a volume rate which may be consistent with the volume rate of the inflow material other than the material that is lighter than water or the volume of the sediments and solids, or at a flow rate or volume of flow that would maintain a level in the ASSST consistent with a minimum and/or maximum height of liquid in the ASSST.

It is preferred that the outflow of water (850) from the ASSST is drawn from a vertical point of the ASSST which may minimize the amount of sediment and/or solid disturbance, is a desired distance from the vibroaccoustical zone, and a desired distance below the level of lighter than water materials, to minimize the amount of non-water materials exiting the ASSST through the outflow.

Material drawn from the ASSST (910) may contain materials that are not water and the water may require clarification prior to further processing and recycling.

It is preferred that water transported from the ASSST is free and clear of all or substantially all solids and materials that are lighter than water and it is beneficial to further clarify the water to ensure all or substantially all solids and materials that are lighter than water are removed prior to further processing and/or recycling.

According to a preferred embodiment of the present invention, the process includes a seventeenth step, where water is transported to the aqueous slurry settlement and flotation cell system (ASFS) where it may be possible to further separate sediments and solids and lighter than water liquids from the water.

It is preferred that materials entering the ASFS enter with a little pressure and velocity as may be attainable and that the lower the pressure and velocity of the materials entering the ASFS (900) are the more efficient the process may be.

Preferably, materials flowing into the ASFS should be expanded to reduce unwanted pressure and velocity energy which may unnecessarily agitate the water in the ASFS. Materials entering into the ASFS a low velocity and pressure will enter a pre-chamber which may encourage lighter than water to float and prevent cavitation which may cause emulsion of materials.

Materials entering into the ASFS (900) are transported in a manner which is conducive to preventing or reducing the amount of undissolved air that can be entrained in the material.

Simultaneously, the pre-chamber area of the ASFS may impede forward momentum of solids and sediments and encourage settlement of solids and sediments to the bottom of the chamber.

Methods to encourage the floatation of lighter than water materials may include; eddy currents, magnetic fields, micro air entrainment or other such methods as may be required and based on the physical characteristics of the lighter than water materials which are desired to be floating on the surface of the ASFS tank water.

According to a preferred embodiment of the present invention, in the ASFS a state of low vacuum is maintained above the level of the lighter than water material which may further assist lighter than water materials to float on the water surface and which may further cause the lighter than water materials to enter phase state changes from liquid to vapor at the surface of the water, or at other points within the material and may impede the lighter than water material to retain suspended solids or sediments and which would impede the lighter than water material to emulsify or suspend water in it.

Water which is free flowing from the pre-chamber of the ASFS through the ASFS and to the outflow may contain lighter than water materials and/or solid and sediment materials which are not desired.

According to a preferred embodiment of the present invention, water flowing through the ASFS to the ASFS water outflow will exit the pre-chamber at a desired vertical height above the tank moving forward and passing upwards through a zone of concentrated micro bubbles of air.

The micro air bubbles may assist lighter than water materials to rise to the surface of the water in a shorter period of time by impeding and/or redirecting the energy from forward momentum and directing it to a greater degree of upward momentum. The micro air bubbles may assist the settlement of sediments and solids suspended in the water or lighter than air materials by impeding forward momentum and therefore allowing the materials to settle to the bottom of the tank over a reduced vertical distance and the settled material is discharged via a settlement material ejection to waste conduit (970).

Figure 11:
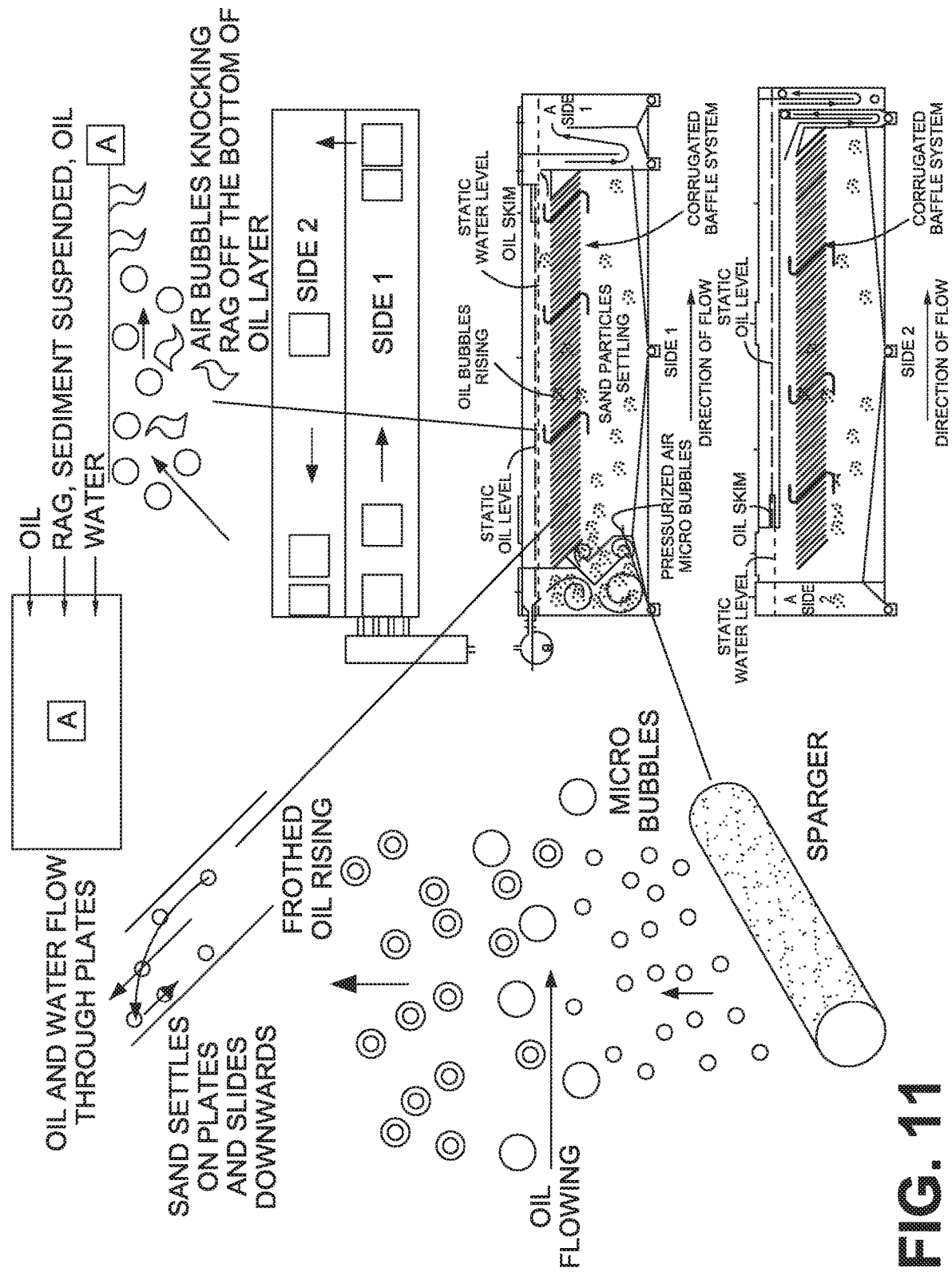
FIG. 11 is a combination schematic showing the interactions and their location between air/water/oil in a clarifier used in the system according to a preferred embodiment of the present invention.

As seen in FIGS. 9, 10 and 11, the water flowing through the ASFS (900) to the ASFS water outflow (950) will travel vertically through a series of baffles which are spaced apart from one another and on an angle which is not perpendicular to the flow of the water but that are perpendicular to each other.

The number of baffles is determined by the desired spacing of each baffle and the horizontal length of the baffle zone of the ASFS which is determined by determining the user desired flow rate and the required amount of time a volume of water may be required to be suspended in the ASFS to meet the user desired effects and efficiency of clarification required.

The vertical height of the area water is required to travel through the baffle area is determined by determining the user desired flow rate and the required amount of time a volume of water may be required to be retained in the ASFS to meet the user desired effects and efficiency of clarification required. The vertical height of the baffle area and overall horizontal length of the baffle area of the ASFS and retention time of water flowing through the ASFS may consider industry standard statistics, and acceptable statistical standards for, settlement of solids in water.

Water flowing through the ASFS to the ASFS water outflow may flow into an air break chamber where it can be transported from the ASFS to a containment tank for further processing or recycling as intended by the user.

The ASFS air break chamber at the ASFS outflow may reduce or eliminate adverse effects of water flowing at an accelerated and potentially inconsistent rate, from a controlled flow environment. The ASFS air break chamber at the ASFS outflow may reduce or eliminate balancing complications of the ASFS based on increased or decreased inflow volume rates and ensure the outflow rate is consistent with maintaining a desired minimum and maximum level of water in the ASFS.

According to a preferred embodiment of the present invention, the process includes an eighteenth step, where the lighter-than-water materials which are floating on the surface of the water of the ASFS are skimmed from the water surface in a manner that is free flowing and which would encourage a minimum level of lighter than water materials to remain in place.

Lighter-than-water materials which may be skimmed from the surface of the water in the ASFS gravity and free flow into a chamber (960) which encourages an air break from the balance of the internal environment of the ASFS. Lighter than water materials are transported from the ASFS air broken chamber to a containment tank for final disposition or further treatment as the user may intend. Preferably, the lighter than water materials that are transported from the ASFS to a containment tank are removed from the ASFS without imposing any adverse effects on the internal environment of the ASFS that would have any negative effect on the efficiency of the ASFS process.

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention.

Embodiments were chosen and described in order to best explain the principles of the invention and the practical application, and to enable others of ordinary skill in the art to understand the invention for various embodiments with various modifications as are suited to the particular use contemplated. To the extent that the following description is of a specific embodiment or a particular use of the invention, it is intended to be illustrative only, and not limiting of the claimed invention. One skilled in the art will understand that portions of the example or aspect may be used in combination with other examples or aspects of the invention.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to combine, affect or connect such aspect, feature, structure, or characteristic with other embodiments, whether or not such connection or combination is explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percent or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited, and such terms refer to ranges that can be subsequently broken down into sub-ranges as discussed above. In the same manner, all ratios recited herein also include all sub-ratios falling within the broader ratio.

What is claimed is:

1. A method of cleaning contaminated solid particles comprising the steps of:
    creating a slurry comprising waste material comprising contaminated solid particles by mixing said waste material with a liquid;
    passing the aqueous slurry of material and water through a venturi inductor which uses pressurized water flow to re-suspend and blend the slurry to a desired density, pressure, velocity, temperature and/or other parameters prior to introduction into the high velocity accelerator;
    introducing said slurry into an entry port located at a first extremity of a high velocity accelerator, where said high velocity accelerator is adapted to impart an increase in the velocity of the material introduced therein;
    processing the slurry in said high velocity accelerator; by rapidly expanding the volume of said slurry introduced into the high velocity accelerator without diminishing the velocity thereof;
    imparting a rapid acceleration at an angle to the slurry of solid and liquid materials to displace said slurry in a concentric path towards an outflow port situated at one extremity of an internal chamber of the high velocity accelerator; and
    focusing the slurry at a focal point to promote interparticle collisions.

2. The method according to claim 1, further comprising separating solid particles from other components in the slurry.

3. The method according to claim 1, further comprising a step of separating solids, liquids and gases from the outflow port of the high velocity accelerator according to their density by feeding the resulting liquid flow through at least one separation module.

4. The method according to claim 1, further comprising a step of introducing aqueous material into a mixing tank where materials are separated into free liquid and saturated solids.

5. The method according to claim 1, further comprising a step of mixing saturated solids or saturated solids with minimal volumes of liquids with water to form said slurry and further blending said slurry to an average consistency and ensuring that the solids remain suspended in the slurry prior to their introduction in the high velocity accelerator.

6. The method according to claim 1, further comprising a step where the waste material enters a first stage of a Rapid Material Separation System (RMSS) at an inlet of a cyclone where the material may be entrained with air or some other inert and/or expandable gas.

7. The method according to claim 6, further comprising a step where the materials exiting an overflow from the RMSS first stage cyclone are deposited into a blow-off settlement tank where the material are agitated and transported to an Accelerated Solid Separation and Settlement Tank ASSST apparatus.

8. The method according to claim 7, further comprising a step where the material exiting an underflow of the RMSS first stage cyclone will freely fall into a conical hopper that will feed the material into a venture inductor where the material is drawn in to a pressurized jet stream of water and into a slurry state where the materials are blended, suspended and agitated at a pre-determined pressure and velocity.

9. The method according to claim 7, further comprising a step where the slurry which may be transported to the ASSST inlet to be agitated, singularly or in a combination of, mechanical agitation and/or agitation caused by the injection of air.

10. The method according to claim 9, further comprising a step where water is transported from the ASSST, at a volume rate which may be consistent with the volume rate of the inflow material other than the material that is lighter than water or the volume of the sediments and solids, or at a flow rate or volume of flow that would maintain a level in the ASSST consistent with a minimum and/or maximum height of liquid in the ASSST.

11. The method according to claim 1, further comprising a step where the waste material enters a second stage of a RMSS at the inlet of a cyclone where the material will be entrained with air or some other inert and/or expandable gas.

12. The method according to claim 11, further comprising a step where the material exiting an overflow from the RMSS second stage cyclone are deposited into a blow-off settlement tank where the material is agitated and transported to an Accelerated Solid Separation and Settlement Tank (ASSST).

13. The method according to claim 12, further comprising a step where the material that exits an underflow from the RMSS second stage cyclone falls freely into a container optionally equipped with a method for extracting solid materials separately from liquid materials that are free and not trapped as saturation of solid materials.

14. The method according to claim 1, further comprising a step where solid materials may be transported with a wet screw that is equipped with pressurized water jets to clean and remove any unwanted residue from the solids.

15. A method according to claim 1, wherein the liquid used in creating the slurry comprising waste material is selected from the group consisting of: water; lighter-than water solvents; combinations thereof.

16. A method according to claim 15, wherein the liquid used in creating a slurry comprising waste material is water.

17. A method according to claim 1, wherein the high velocity accelerator comprises:
an internal chamber;
a material inlet port;
a material outlet port;
a back wall surrounding the inlet port;
an internal wall having a first end connected to the back wall and a second opposite end tapering to the outlet port, the first end being located proximate the inlet port and the second end being located proximate the outlet port;
a plurality of injection ports positioned along the periphery of the internal wall proximate the first end;
wherein said inlet port having a diameter smaller than the diameter of the internal chamber, and the injection ports are adapted to inject at a high rate of displacement a fluid which, in operation, will create a vortex inside the chamber thereby entraining a material towards the outlet port.

18. A method of removing oil contaminants on solid particulates comprising the steps of:
using a liquid to create a slurry of the contaminated solids;
processing the slurry in a high velocity accelerator:
by rapidly expanding the volume of said slurry introduced into the high velocity accelerator without diminishing the velocity thereof;
imparting a rapid acceleration at an angle to the slurry stream of solid and liquid materials to displace said slurry stream in a concentric path towards an outflow port situated at one extremity of an internal chamber of the high velocity accelerator; and
focusing the slurry stream at a focal point to promote interparticle collisions;
which said interparticle collisions cause a separation of particulates and oil contaminant and further result of dissimilar liquid separation and dissimilar particulate separation through the induction of a state where liquids vaporize;
separating solid particulates from other components in the liquid flow; and
a series of separation modules which receives the output of the apparatus and separates solids, liquids and gases according to their density.

19. A method of removing oil contaminants on contaminated solid particulates comprising the steps of:
a) using water at a temperature below standard hot water extraction process temperature to create an aqueous slurry of the contaminated solids;
b) processing the slurry in a high velocity accelerator:
by rapidly expanding the volume of said slurry introduced into the high velocity accelerator without diminishing the velocity thereof;
imparting a rapid acceleration at an angle to the slurry stream of solid and liquid materials to displace said slurry stream in a concentric path towards an outflow port situated at one extremity of an internal chamber of the high velocity accelerator; and
focusing the slurry stream at a focal point to promote interparticle collisions;
which said interparticle collisions cause a separation of particulates and oil contaminant;
c) separating solid particles from other components in the resulting output liquid flow; and
d) separating the output liquid flow of the high velocity accelerator into liquid and gas streams according to their density.

* * * * *